Patented Nov. 14, 1922.

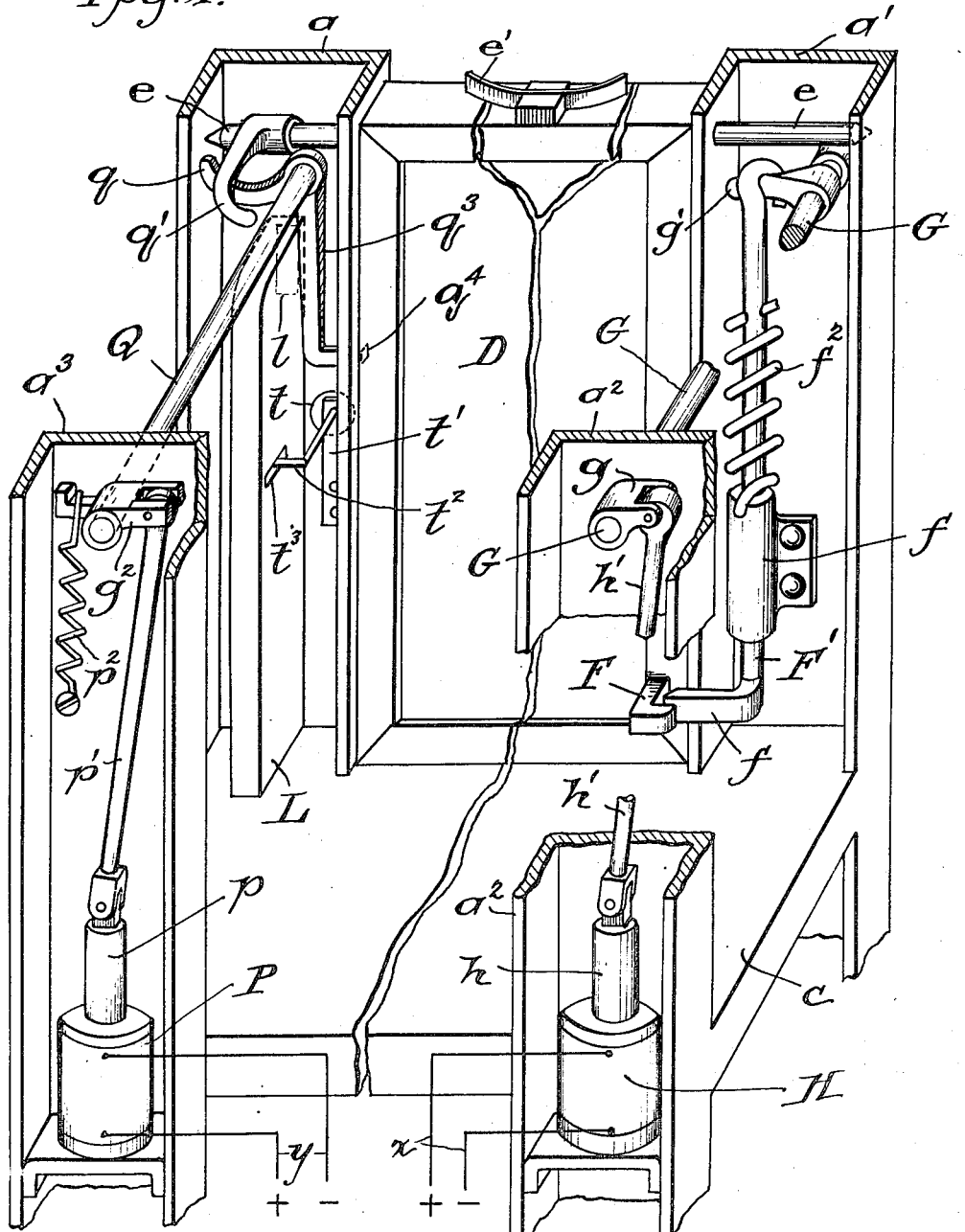

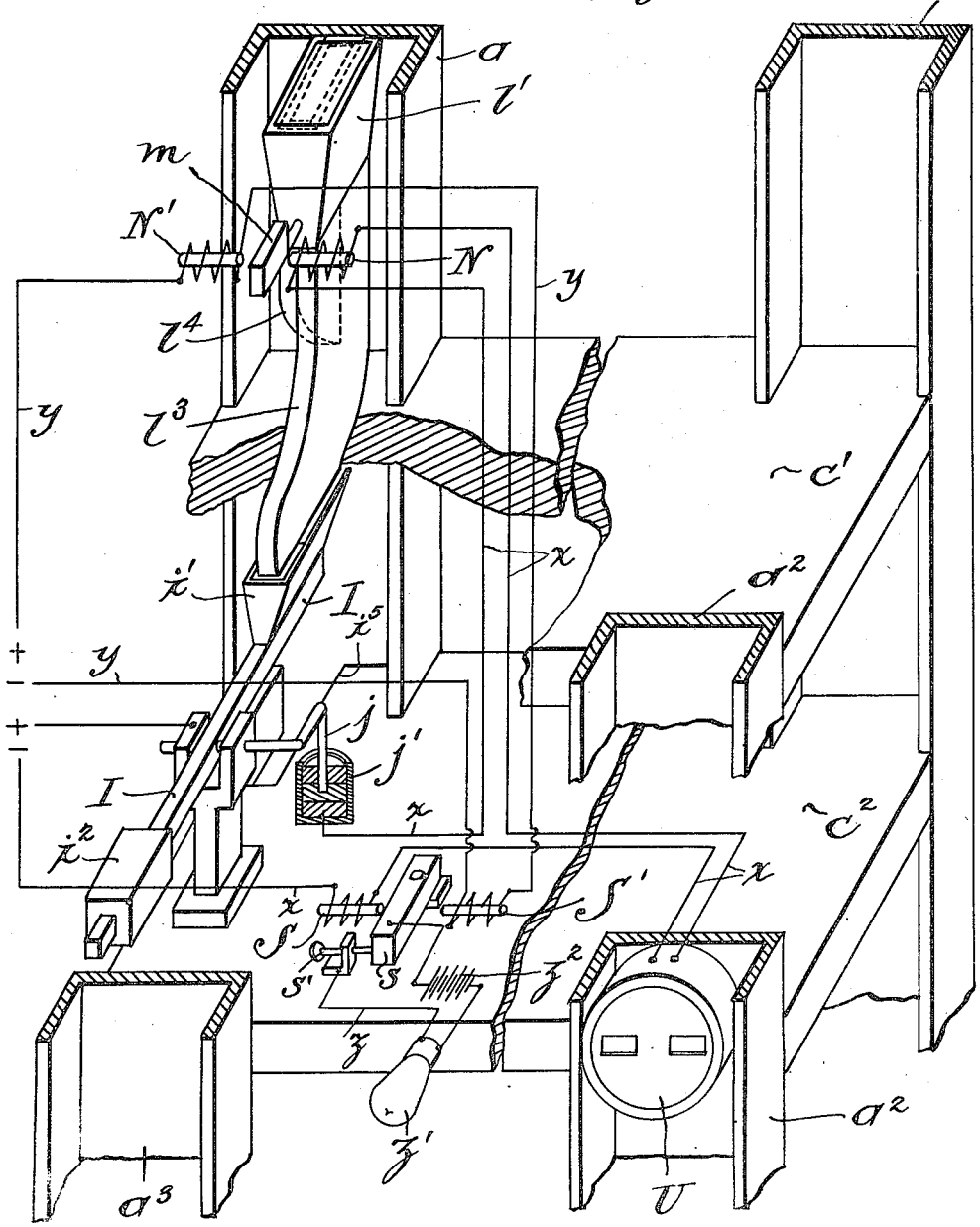

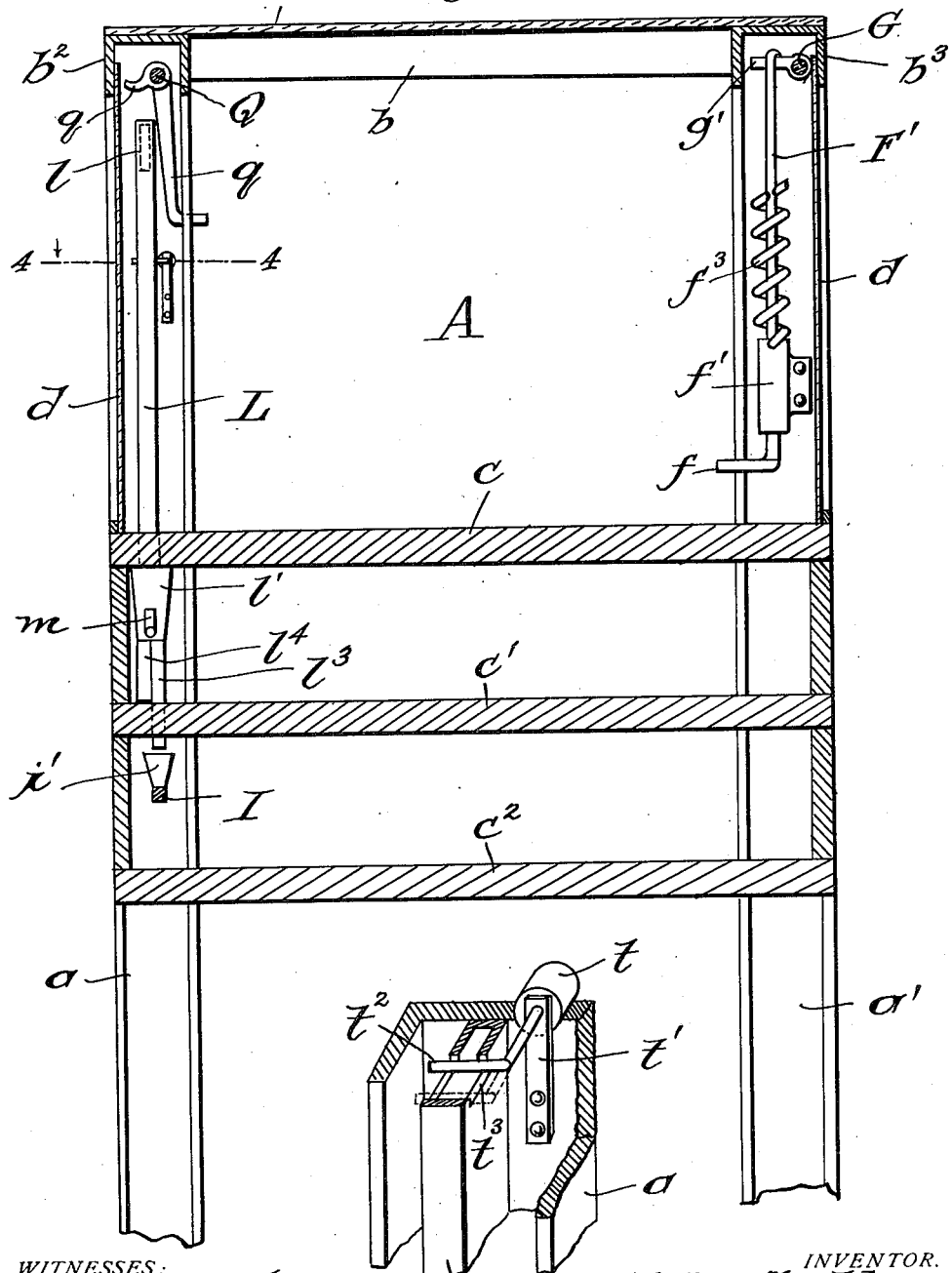

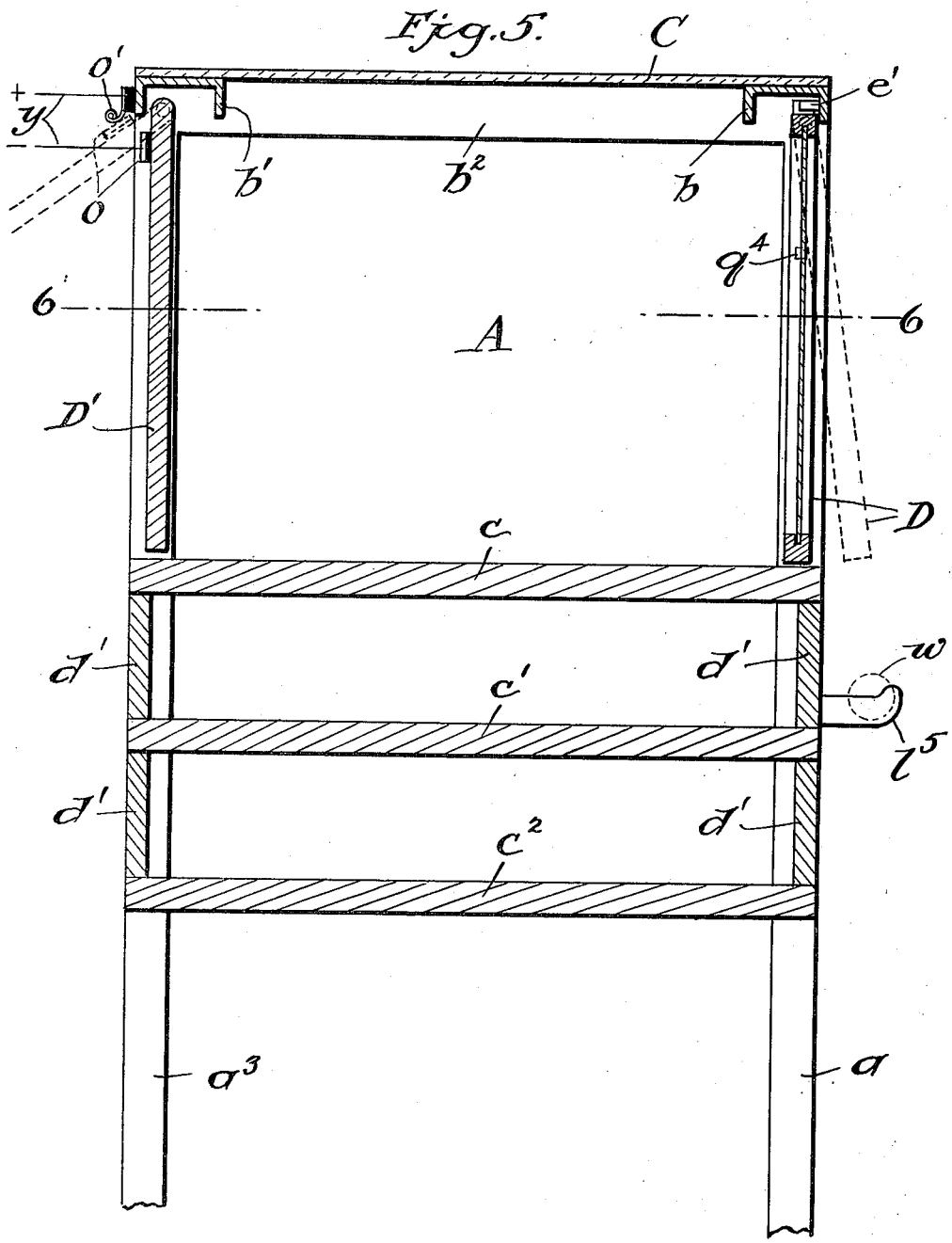

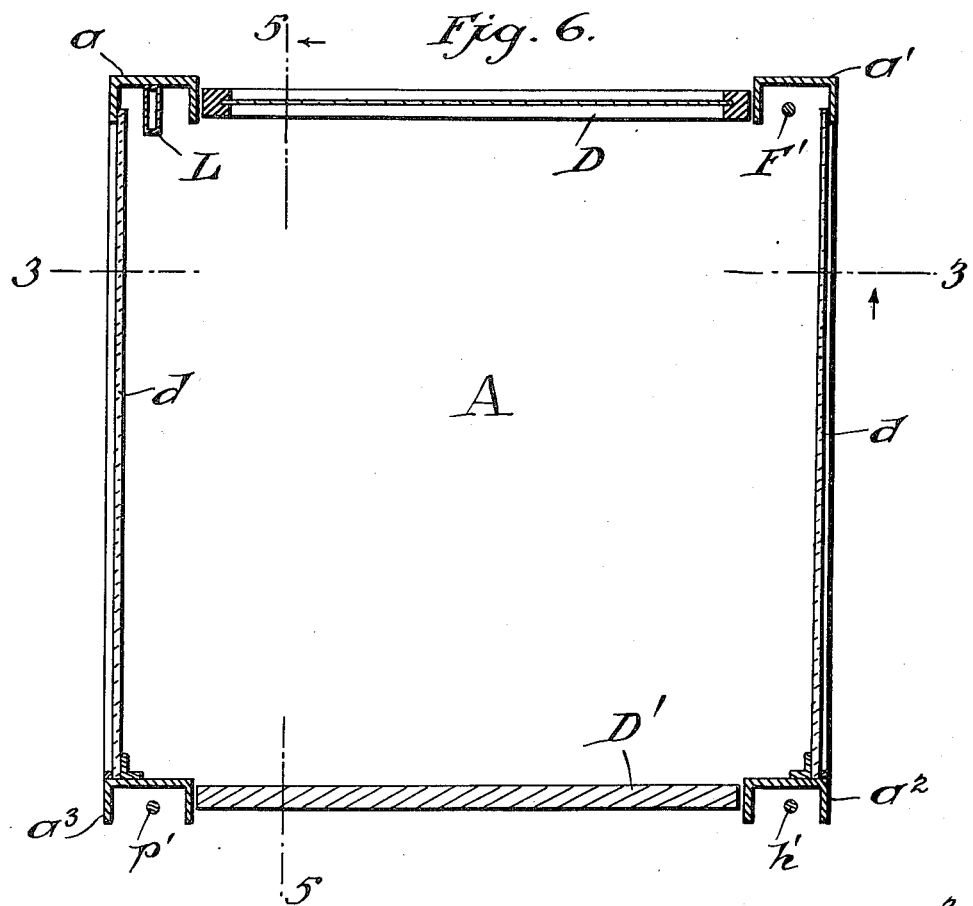
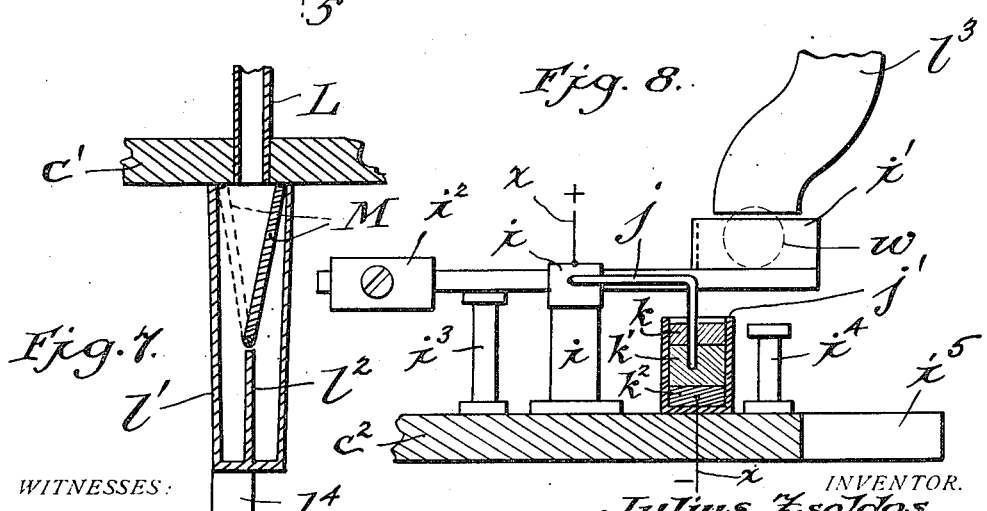

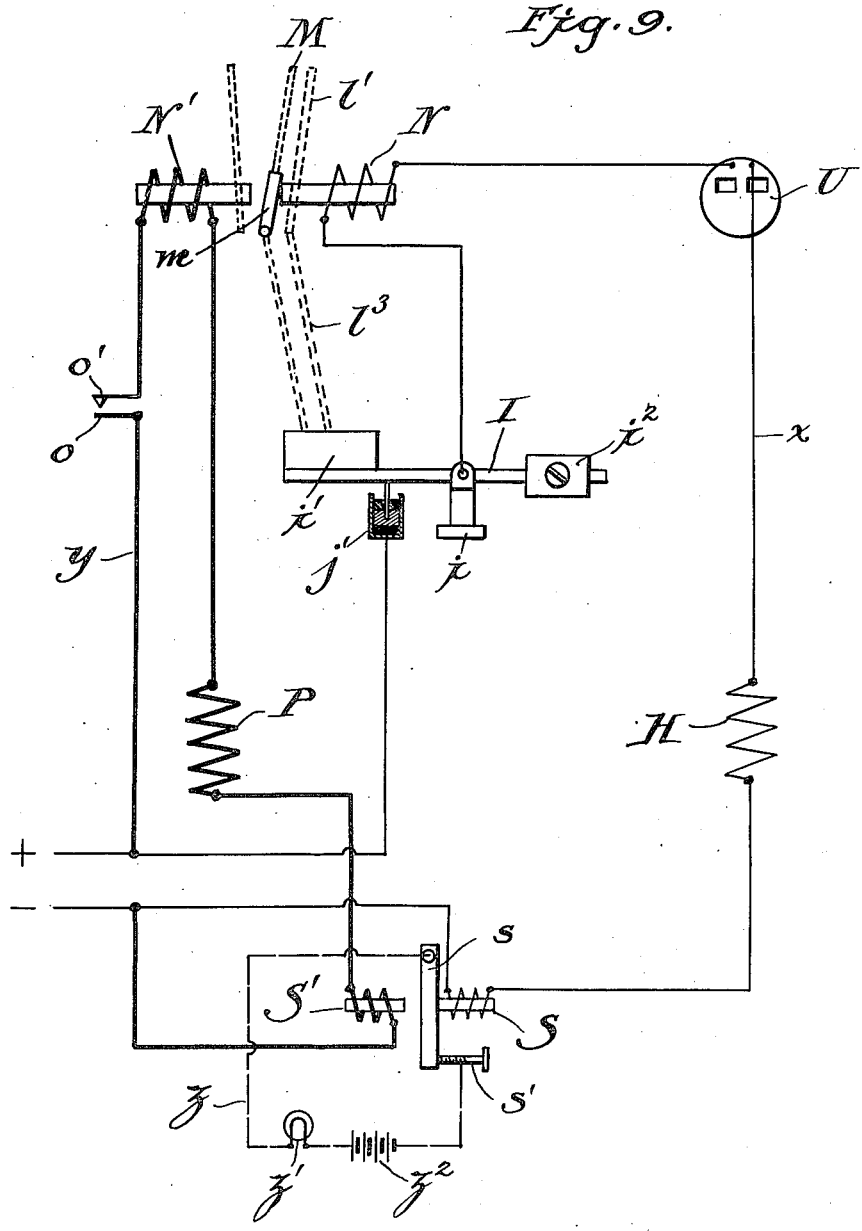

1,435,440

UNITED STATES PATENT OFFICE.

JULIUS ZSOLDOS, OF BROOKLYN, NEW YORK, ASSIGNOR TO RESTAURANT MACHINERY COMPANY, A CORPORATION OF DELAWARE.

AUTOMATIC FOOD-VENDING MACHINE.

Application filed March 2, 1917. Serial No. 151,930.

*To all whom it may concern:*

Be it known that I, JULIUS ZSOLDOS, a subject of the Emperor of Austria-Hungary, residing in the city of New York, borough of Brooklyn, county of Kings, and State of New York, have invented a certain new and useful Automatic Food-Vending Machine, of which the following is a specification.

This invention is an automatic food vending machine, and, primarily, the objects of the invention are to vend food in a simple, efficient and certain manner, and to display the food to be vended not only in a manner to be highly attractive to patrons, but under exceptional sanitary conditions.

With the foregoing objects in view, the invention embodies, among others, the following features: first, a food vending machine wherein the chamber containing the food to be dispensed is formed, mainly, of transparent walls, whereby the food is readily visible and the chamber exposed to the sanitary effect of light; second, a food vending machine wherein the food chamber is provided with a door for introducing the food therein, and a door for removing the food therefrom, said latter door being automatically opened, upon the introduction of a coin, or equivalent, into the coin-actuated mechanism, by means concealed from the view of the prospective purchaser; third, a food vending machine embodying a food dispensing chamber provided with a charging closure and a discharging closure, the discharging closure being automatically unlocked by the insertion of a coin into the machine to allow of the removal of the food from said chamber, and subsequently automatically relocked, upon the opening of the charging closure, for the recharging of the chamber; fourth, a food vending machine wherein the food chamber consists, substantially, of a skeletonized frame for supporting panels, mainly transparent, said frame serving the further function of housing and concealing the operating mechanism for the closure of the discharge opening; fifth, a food vending machine wherein the closure for the discharge opening, after being opened to allow of the removal of the food, is automatically locked in open position to indicate to the prospective purchaser that the food chamber is empty, and is automatically released, closed and relocked upon the recharging of the food chamber; sixth, a food vending machine embodying signalling means rendered operative upon the removal of food from the dispensing chamber, and subsequently rendered inoperative upon the positioning of food in said chamber, whereby the attendant is apprised that the food chamber should be recharged; seventh, a food vending machine embodying, as one of its elements, a co-operating cash register, whereby, upon the insertion of a coin to dispense the food, said coin is automatically registered, and, eighth, improved devices, mechanical and electrical, for effecting the various operations hereinbefore outlined.

Features of the invention, other than those specified, as well as the advantages thereof, will be apparent from the hereinafter detailed description taken in conjunction with the accompanying drawings.

In the accompanying drawings I have illustrated one practical embodiment of the invention, but the construction therein shown is to be understood as illustrative, only, and not as defining the limits of the invention.

Figure 1 is a perspective view of the food dispensing chamber and adjacent mechanical and structural elements as viewed from the rear of the vending machine of this invention. In the interest of clearness, the upper portion of the structure is removed and certain parts broken away to clearly show the front door locking and unlocking mechanism, the rear door being omitted.

Figure 2 is a similar view of that portion of the machine directly beneath the floor of the food dispensing chamber. In this view, also, portions of the construction are broken away in the interest of clearness.

Figure 3 is a vertical transverse section of the machine taken in the plane of the line 3—3 of Figure 6.

Figure 4 is a section on the line 4—4 of Figure 3, the parts being shown in perspective.

Figure 5 is a vertical front-to-back section of the machine, taken in the plane of the line 5—5 of Figure 6.

Figure 6 is a horizontal section taken in the plane of the line 6—6 of Figure 5.

Figure 7 is a vertical, sectional detail of certain mechanism for directing the passage of a coin in its travel through the machine.

Figure 8 is a side elevation, partly in section, of means, operable by a coin, for controlling the operation of the discharging closure locking means, and Figure 9 is a diagrammatic view illustrating the electric circuits preferably employed and the mechanical actuating devices connected therewith.

Referring to the drawings, $a$, $a'$, $a^2$ and $a^3$ designate four upright corner posts, which, in the preferred embodiment of the invention, are in the form of metallic channel sections. As shown best in Figures 1, 2 and 6, the corner posts $a$ and $a'$ at the front of the machine, as well as the remaining corner posts $a^2$ and $a^3$ at the rear thereof, are so disposed that the flanges of the channel sections from which they are formed extend rearwardly so as to provide in the back of each corner post an upright, channel-shaped space or cavity, whereby mechanism positioned therein is invisible to a person viewing the machine from the front thereof.

The four corner posts $a$—$a^3$ are maintained in spaced, upstanding relation by means of horizontal ties $b$ $b'$ extending across the front and back of the machine, respectively, and secured at their opposite ends to the upper ends of the corner posts, while similar horizontal ties $b^2$ $b^3$ secure the upper ends of the corner posts $a$ and $a'$ to the corner posts $a^3$ and $a^2$, respectively. Like the corner posts, the ties $b$—$b^3$ are also of channel section, but, in the construction of the frame of the machine, these tie channel sections are inverted so as to leave the top of the frame flush, while within and beneath each channel section is formed a channel-shaped passage adapted to house certain operating mechanism in concealed position. The ties referred to thus maintain the upper ends of the corner posts in spaced relation, while positioned at lower levels, and secured at their four corners to the corner posts, is a plurality of shelves or partitions, $c$, $c'$ and $c^2$, which also serve to maintain the corner posts in spaced relation, said shelves having further functions hereinafter described.

Across the top of the frame thus constructed is positioned a cover or top C, preferably made of glass to facilitate the illumination of the compartment A intermediate said top C and the partition $c$, in which compartment is adapted to be positioned the food to be vended, said compartment being hereinafter termed the dispensing chamber. The lateral sides of compartment A are preferably closed by glass panels $d$, while the front or discharge opening of said compartment is provided with a door or closure D, and the back or charge opening with a door or closure D'. The front and sides of each of the compartments formed between the shelves $c$ and $c'$ and $c'$ and $c^2$ are closed by panels $d'$, which are preferably of an opaque nature so as to conceal certain operating mechanism housed within said compartments.

The front door or discharge closure D is preferably provided with a transparent glass viewing panel and is pivoted, near its upper edge, on a pair of trunnions $e$, mounted on the door and journaled in the adjacent flanges of the corner posts $a$ and $a'$. The door substantially fills the opening in which it is positioned, and its upper edge extends upwardly between the depending flanges of the channel tie $b$, as shown in Figure 5. A spring $e'$ is mounted upon the top of the door and engages at its opposite ends with the inner surface of the outer flange of the tie $b$, the function of which spring is to oscillate the door on its trunnions to a slightly open position, when said door is not positively locked shut. The door is locked in closed position by means embodying a keeper F, mounted on, and projecting inwardly from, the door, and with which cooperates the toe $f$ of a locking latch F'. Latch F' is in the form of a stem mounted for longitudinal and rotative movement in a journal $f'$ fixed on the back of the corner post $a'$ and so positioned that the stem is disposed between the flanges of said corner post and is thus concealed from view from the front of the machine. A spring $f^2$ is coiled about the stem of latch F', being secured at its upper end to said stem, to preclude relative movement, and at its lower end to the journal $f'$. This spring has the dual function of depressing latch F' and simultaneously rotating the toe $f$ thereof into engagement with the edge of the adjacent flange of the corner post $a'$. With this construction, it is manifest that, if door D is forced into its fully closed position, latch F' will rotate slightly against the tension of spring $f^2$, to allow the nose of the keeper F to pass by the toe of the latch, after which said spring will return the toe $f$ into engagement with the edge of the flange of the corner post, in which position said toe will occupy a position forward of keeper F and lock the door in closed position.

To release the door from its locked condition, it is only necessary to elevate the stem of latch F' against the tension of spring $f^2$, which operation will lift the toe $f$ of said latch free from engagement with keeper F, whereupon spring $e'$ on the top of the door will immediately shift the door to the partially open position described, and shown in dotted lines in Figure 5. This elevation of the latch is accomplished through the oscillation of a rock-shaft G, disposed in parallel relation to the upper horizontal tie $b^3$ and positioned between the depending flanges thereof so as to be in concealed position. The forward end of rock-shaft G is journaled in a bearing on the inner side of corner post $a'$, and the rear end of said shaft extends through the corner post $a^2$ and is provided rearwardly thereof with a fixed crank arm $g$. Mounted on rock-shaft G, and adjacent the forward end thereof, is a fixed laterally projecting finger $g'$, with which the hook-shaped upper end of latch F' is adapted to engage, as shown in Figure 1. It will thus appear that, if rock-shaft G is oscillated in a clockwise direction, the stem of the latch will be elevated and the toe $f$ thereby raised to free the keeper F and unlock the door.

This oscillation of rock-shaft G, which results in the unlocking of the door as described, is, in this machine, made conditional upon the depositing of a coin of a predetermined value into the machine, and is dependent upon means, governed by said coin, for completing an electric circuit through a solenoid or electromagnet H, the core $h$ of which is connected, through a link $h'$, with crank arm $g$ fixed to the rear end of said rock-shaft. The parts are so associated that, when current is passed through the solenoid, the core thereof will be lowered or pulled down into the coil of the solenoid, thereby oscillating the rock-shaft in a clockwise direction, elevating the toe $f$ of the latch, and unlocking the door.

The electric circuit which controls the operation of solenoid H is shown in relatively light lines in Figure 9, and is designated $x$. In Figure 9, the several electric circuits which control the complete operation of the machine are illustrated in such manner as to distinguish each circuit from the others, the circuit $x$ being shown, as stated, in relatively light lines, the circuit $y$, the function of which will be hereinafter described, being shown in heavier lines, while the circuit $z$, which is of a local nature, is shown in dash lines.

The circuit $x$ is fed from any source of electrical supply, such as a street main, through suitable resistance or a transformer, not shown, and within the machine is a coin-operated switch, shown in Figure 9 and detailed in Figure 8. This switch embodies a rocker arm I pivoted intermediate its ends on a bracket or standard $i$. At one end of the rocker arm is a V-shaped coin receiving tray $i'$, while at its other end the rocker arm is counter-balanced by a weight $i^2$, which may be adjusted to normally maintain said arm in engagement with the movement limiting post $i^3$. The adjustment, however, is of such delicate nature that, when a coin $w$ is received within the V-shaped tray, its weight will serve to destroy the equilibrium and cause the rocker arm to tilt and come into engagement with the post $i^4$, in which position the coin will roll out of the open end of said tray and fall through an aperture $i^5$ formed in the partition $c^2$, on which said switch mechanism is mounted, to be received in a suitable receptacle or drawer (not shown) positioned therebeneath. Associated with the pivot or spindle on which the rock-shaft is journaled is a contact $j$, shaped in the form of a crank, with the end thereof depending into a vessel $j'$ resting upon the upper face of partition $c^2$.

Within the vessel $j'$ is retained, in stratified condition, three liquids, $k$, $k'$ and $k^2$. The liquid $k^2$ is preferably mercury, liquid $k'$ alcohol, and liquid $k$ kerosene oil. The post or standard $i$ is in electrical communication with the circuit $x$, while the mercury within the vessel $j'$ forms the other pole of the circuit, said circuit being established when the rocker arm is tilted sufficiently to bring the depending end of the crank arm $j$ into contact with the mercury in the vessel. The alcohol is a very poor conductor, and precludes the carbonizing of the mercury or metallic contact $j$, while the kerosene precludes the evaporation of the alcohol due to its volatility. It will, of course, be understood that other liquids might be employed in lieu of those described, but the illustration given is of a form which I have found highly practical and efficient.

The dash-pot switch described is the one which I prefer to employ, as practically no friction is encountered and a perfect contact is assured. However, it is possible that a purely mechanical contact might be availed of, and, accordingly, the invention is not limited to such dash-pot contact.

From what has been said, it will be apparent that, when a coin is deposited within the tray $i'$ and the circuit $x$ closed thereby in the manner specified, the solenoid H will be energized and the door D unlocked, all depending upon the presence of such coin in the tray. The coin is deposited in the machine through a coin slot $l$, preferably formed in the corner post $a$. Registering with the coin slot $l$ is a coin chute L, through which the coin passes from the slot $l$, downwardly through partition $c$, and is received therebeneath by switch mechanism adapted, if there is food in chamber A, to deliver the coin to the switch operating tray $i'$, or, if there is no food in chamber A, to return the coin to the depositor. Coin chute L is positioned immediately anterior of the web of corner post $a$, and intermediate the flanges thereof so as to be in concealed position.

The switch mechanism, as shown best in Figures 2 and 7, embodies a casing $l'$, somewhat thicker through than the coin slot, the lower portion of which is divided by a partition $l^2$ into two parts, one of which has communication at its base with a branch $l^3$ of the coin chute, which branch leads to the tray $i'$. The other division of the casing $l'$ is in communication with the second branch $l^4$ of the coin chute, said branch extending downwardly and forwardly and having its outlet in a return tray $l^5$ positioned exterior, and at the front face, of the machine. Pivoted along the upper edge of partition $l^2$ is a flap valve M, which may be oscillated from one side to the other to direct a coin, dropping through the chute L, into either of its branches. The operation of this flap valve is governed by the common armature $m$ of two magnets N N', said armature $m$ being positioned upon the spindle which serves as the axis of oscillation of the flap valve M. Thus, when the magnet N is energized, the flap valve will be moved to the position shown in full lines in Figure 7 and in dotted lines in Figure 9, to direct a coin, subsequently passing through the chute, into the discharge branch thereof, whereby said coin will be returned to the depositor. Magnet N is included in the circuit $x$, and it thus becomes apparent that the unlocking of the door in the manner hereinbefore specified, through the energization of the circuit $x$, will automatically shift the flap valve to such position that a coin subsequently deposited in the coin slot $l$ will be returned to the depositor, unless some further operation has taken place. Such operation is, in accordance with this invention, made conditional upon the positioning of further food within chamber A, so that, after the article of food within the chamber has been vended, all subsequent coins deposited in the machine will be returned, unless said chamber has been recharged.

Food is introduced into chamber A through the back door or charge closure D', which, as shown in Figure 5, is provided at opposite sides with trunnions journaled in the corner posts $a^2$ $a^3$. In charging chamber A, it is, of course, necessary to open the door, and with the door is associated switch mechanism whereby the opening operation serves to complete a circuit $y$, shown in relatively heavy lines in Figure 9. The switch mechanism is best shown in Figure 5 as embodying a rigid, insulated contact $o$, mounted on the door, and an insulated, spring contact $o'$ mounted on the transverse tie $b'$. When the door is opened to the dotted line position of Figure 5, contact $o$ will engage with contact $o'$ and complete the circuit $y$ at this point.

In circuit $y$ is included magnet N', hereinbefore referred to, for operating the flap valve M to a position wherein a coin, dropping through the coin chute, will be directed through branch $l^3$ thereof and to the switch operating tray $i'$. Also included within circuit $y$ is a solenoid or electro-magnet P, the function of which, when energized, is to automatically close and lock the front door D, when the circuit $y$ is energized through the opening of the back door D', incident to the charging of chamber A.

It has been stated that, after the food within chamber A has been removed by a purchaser, the spring $e'$ at the top of the front door maintains said door in the slightly opened position shown in dotted lines in Figure 5. The door remains in this position until subsequently positively closed through the energization of the solenoid P by the opening of the back door D'. This automatic closing of the front door is effected through a rock-shaft Q, which is positioned beneath the tie $b^2$ in the same manner as rock-shaft G is positioned beneath tie $b^3$. Fixed near the forward end of the shaft Q is a laterally projecting finger $q$, which cooperates with a finger $q'$ fixed on one of the trunnions $e$ of the front door D. Fixed to the rear end of shaft Q is an actuating arm $q^2$, which is connected through a link $p'$ to the core $p$ of the solenoid P. The link $p'$ is normally maintained in elevated position, and the finger $q$ maintained substantially free from engagement with the finger $q'$, by a spring $p^2$ associated with the operating arm $q^2$, as shown in Figure 1. However, when the solenoid P is energized through the closing of the circuit $y$, depending upon the opening of the back door D', the core $p$ is drawn within solenoid P, thereby rotating the rock-shaft Q in a clockwise direction and bringing an upward pressure to bear, through the finger $q$, upon the finger $q'$. If the front door D is in open position, such upward pressure on the finger $q'$ will overcome the tension of the spring $e'$ on the top of the door and move the door into closed position. During this closing operation, the door will automatically become locked through the cooperation of keeper F and latch F', as hereinbefore described. Thus, the opening of the back door, to recharge the chamber, automatically effects the closing of the front door, without necessitating the attendant reaching through the compartment and pulling the front door shut before recharging the chamber. This is of considerable importance in the commercial adaptation of the present invention, since, when so employed, a large number of these vending compartments are arranged in tiers positioned side by side, which makes it impossible for the attendant to reach around to the front to close the door, and makes it necessary for him to reach through the compartment, pulling the door shut through the back.

In the preferred form of the machine of this invention, the maintaining of the front door D in partially opened position, when the chamber is empty, is not dependent entirely upon spring $e'$, since it is desired to have the prospective customer know, upon approaching a compartment, that the compartment is empty, if such is the case, and this may be very readily accomplished by having the door slightly ajar, since, manifestly, no one would drop a coin into a machine to open a door, if the door were already open. Accordingly, in the embodiment illustrated, means is provided for positively precluding the relocking of the door if a customer, after removing the food from chamber A, slams the door shut. This means is shown in the form of an arm $q^3$ secured to rock-shaft Q and provided with a nose working through an aperture $q^4$ in the inside flange of the corner post $a$. Arm $q^3$ is so mounted on the shaft that the tension of spring $p^2$ normally oscillates shaft Q to protrude the nose of arm $q^3$ through the aperture $q^4$ and project the same into the doorway. When the door is in closed position, the end of said nose will engage with the lateral edge of the door, but, as soon as the door is opened, said nose will be projected across the doorway by the spring $p^2$. Thus, after a customer has opened the door, the slamming of the door shut to such extent as to allow of the locking thereof is absolutely precluded. However, when the solenoid P is energized through the opening of the back door, the nose of the arm $q^3$ is retracted through the opening substantially simultaneously with the upward pressure on the finger $q'$ of the door trunnion, which sequence of operations allows of the automatic, mechanical closing of the front door.

It is desirable, moreover, to provide some means whereby the attendant may be advised when a compartment is empty in such conspicuous manner as to obviate the necessity of walking along behind the compartments and looking into each one to ascertain its condition. This means is embodied in a signal, which may be either audible or visual, the latter form being shown. An electric lamp $z'$ is included in a circuit $z$, preferably local, and energized from a battery $z^2$. A pivoted contact arm $s$ is controllable by a pair of electro-magnets S S', which are included in the circuits $x$ and $y$, respectively, (see Figures 2 and 9). When magnet S is energized, contact arm $s$ is drawn into electrical connection with a fixed contact $s'$ and local circuit $z$ completed, whereas, when magnet S' is energized, contact arm $s$ is drawn away from the fixed contact $s'$ and circuit $z$ broken. This organization of parts and circuits brings about such coordination that, when a coin is deposited in the charged machine, it travels downwardly through the coin chute to oscillate the rocker arm I and complete the circuit $x$, and the front door is unlocked, through solenoid H, to allow of the removal of food. At the same time, magnet N moves the flap valve to a position wherein, if a coin is deposited in the slot before the chamber A is recharged, said coin is returned to the depositor, while magnet S causes the lighting of the signal lamp $z'$, thereby advising the attendant that the food in that particular compartment has been dispensed. When the attendant recharges chamber A, just emptied, the opening of the rear door to accomplish this result automatically closes circuit $y$, with the result that solenoid P closes the front door and magnet N' moves the flap valve to a position to direct the coin to the switch I, while magnet S' breaks the circuit $z$, thereby extinguishing the signal lamp.

It is desirable, from a commercial standpoint, for the proprietor or owner of the machine to know the earnings thereof, and, accordingly, I preferably include within circuit $x$, which unlocks the front door, an electrically operated cash register or counting device U, whereby the intermittent operations of the machine are recorded and their cash value displayed. This enables the proprietor, by glancing at the dials of the registers of the respective machines, to ascertain immediately the earnings of each, without necessitating the counting of the receipts.

It will be noted that in the accompanying drawings, more particularly in Figures 1, 3 and 4, push-button mechanism is shown in connection with the coin chute. This push-button mechanism embodies a push button $t$, normally maintained in operative position by a spring $t'$ and having a rearwardly extending stem $t^2$, bent at right angles and working in a slot $t^3$ in the coin chute L. When the button is in extended position, the stem $t^2$ partakes of the position shown in full lines in Figure 4, so that a coin, passing down the chute, is arrested at this point. When the button is pressed, the stem $t^2$ is shifted to the dotted line position of Figure 4, allowing the coin to proceed on its way through the machine.

The push-button mechanism is incorporated in the machine shown merely for the purpose of uniformity with machines vending and mixing liquids. The machine illustrated is intended for the vending of foods, which are positioned in portions within chamber A, whereas, in dispensing liquids, a slightly different construction is availed of for the proper mixing of the constituents, which construction is dependent, in a measure, upon the actuation of a push-button. Accordingly, I have shown a push-button here so that this machine may be substantially uniform, in its exterior appearance and general operation, with the liquid mixing and vending machines.

From the foregoing description, it will be manifest that the invention possesses numerous advantages, among which may be mentioned the automatic closing and locking of the front door, conditional upon the operation of recharging the dispensing chamber, the concealment of the operating mechanism from purchasers, the positiveness and certainty of the operations of the machine, the immediate signalling of the attendant incident to the vending of an article, the incorporation in the mechanism of cash recording means, whereby the proprietor may know, at a glance, the receipts from any particular machine, and the construction of the frame in such manner that the majority of the walls which form the dispensing chamber are made from transparent material, such as glass, with consequent advantages in the display of food, attractiveness of the machine, and sanitary features, all of which are contributing factors of great importance to the practicability and commercial success of the machine. In fact, five of the six walls which form the food compartment may be made of glass, substantially the only opaque portions being the floor of the food compartment and the four corner posts. The result is that the machine of this invention, when so constructed, appears more in the nature of the conventional form of show-case than a vending machine. In this respect, it will be noted that, in the interest of clearness, the corner posts have been shown on a greatly enlarged scale, whereas, in the commercial adaptation of the invention, they are relatively small with respect to the dimensions of the food chamber.

Moreover, in contradistinction to the food vending machines now in use, there are no dark chambers, for housing the operating machinery, around the food compartments. This feature not only permits of thorough cleaning of the compartments, but is a stimulus to it, as any lack of sanitary cleanliness is readily apparent to both the attendant and prospective customer. Then, again, the absence of said machinery housing chambers permits of the food chambers being compactly assembled in horizontal rows and vertical tiers, a most important factor in the economy of space, and, also, in facilitating the dispensing of the food, since the food is rendered much more accessible to patrons by reason of such compact arrangement of the compartments.

It will be noted, of course, that all the features of construction and advantages referred to need not necessarily be embodied in a single machine, i. e., employed together, since some of the features referred to may be used independently of the others, or in conjunction with other features not specifically described.

The fact that the visual signal is brought into operation conditional upon removing food from the food chamber, and rendered inoperative conditional upon recharging the food chamber, thereby remaining visible so long as the food chamber is empty, greatly facilitates the work of attendants, as well as serving to apprise prospective purchasers. Such a signal is entirely distinct in its function and utility from ordinary flash signals.

Having thus fully described the invention, what I claim as new, and desire to secure by Letters Patent, is:

1. In a food vending machine, a food chamber provided with a charging inlet, a closure therefor, a discharging outlet, a closure therefor, coin actuated means for automatically releasing the discharging closure to allow of the opening thereof, and means for automatically partially opening the discharge closure when it is released in combination with means whereby said discharging closure is automatically closed and locked upon opening the charging closure for inserting food in the chamber.

2. In a food vending machine, a food chamber provided with a charging closure and a discharging closure, and coin-actuated mechanism, operable by the weight of a coin for automatically releasing the discharging closure to allow of the opening thereof, means for maintaining the discharging closure in open position, and means actuated by the opening of the charging closure to introduce food within the chamber, for releasing, closing and relocking said discharging closure.

3. In a food vending machine, a closed food chamber embodying channeled frame elements for supporting the walls of the chamber and, also, the charging and discharging closures for said chamber, in combination with means, concealed in the channeled frame elements, for automatically releasing the discharging closure upon the insertion of a coin in the machine to allow of the opening of said closure.

4. In a food vending machine, a food chamber embodying a skeletonized frame of channeled construction provided with charging and discharging closures, said discharging closure and two lateral walls of the chamber consisting of transparent members, in combination with coin-actuated means concealed within the channeled frame, operable upon the introduction of a coin in the machine, for automatically releasing the discharging closure to allow of the opening thereof.

5. In a food vending machine, a food chamber provided with charging and discharging closures, and means, actuated by the weight of a coin, for automatically releasing the discharging closure, in combination with signalling means for indicating to the attendant that the discharging closure has been released and the food removed from the chamber.

6. In a food vending machine, a food chamber provided with charging and discharging closures, and mechanism actuated by the weight of a coin, for automatically releasing the discharging closure upon the insertion of a coin in the machine, in combination with recording mechanism for indicating the number of coins introduced into the machine.

7. In a food vending machine, a food chamber provided with charging and discharging closures, mechanism actuated by the weight of a coin, for automatically releasing the discharging closure upon the insertion of a coin into the machine, and means for rendering the closing of said discharging closure conditional upon the opening of the charging closure.

8. In a food vending machine, a food chamber provided with charging and discharging closures, mechanism actuated by the weight of a coin, for automatically unlocking the discharging closure to allow of the opening thereof when a coin is deposited in the machine, and means, controlled by the opening of the charging closure for automatically closing the discharging closure.

9. In a food vending machine, a food chamber provided with charging and discharging closures, coin-controlled mechanism for automatically releasing the discharging closure to allow of the opening thereof when a coin is deposited in the machine, a rock-shaft for oscillating the discharging closure into its normally closed position, and electrical means controlled by the operation of the charging closure for actuating said rock-shaft.

10. In a food vending machine, a food chamber provided with charging and discharging closures, coin-controlled mechanism for automatically releasing the discharging closure to allow of the opening thereof upon the insertion of a coin into the machine, means for locking the discharging closure against closing, a rock-shaft for releasing said locking means and simultaneously oscillating the discharging closure into its normally closed position, and electrical means controlled by the operation of the charging closure for actuating said rock-shaft.

11. In a food vending machine, a food chamber provided with charging and discharging closures, electrically actuated means, actuated by the weight of a coin inserted into the machine for releasing the discharging closure to allow of the opening thereof upon the insertion of a coin into the machine, and electrically actuated means, controlled by the operation of the charging closure, for subsequently closing the discharging closure.

12. In a food vending machine, a food chamber provided with charging and discharging closures the latter of which is normally locked, a coin-controlled electric circuit for automatically effecting the unlocking of the discharging closure when a coin is deposited in the machine, and a second circuit for governing the relocking of the discharging closure, said second circuit being controlled by movement of the charging closure.

13. In a food vending machine, a food chamber provided with charging and discharging closures, a coin-controlled electric circuit for governing the opening of the discharging closure, and a second circuit for governing the closing of the discharging closure, said second circuit being controlled by movement of the charging closure, in combination with signalling means, controlled by said circuits, whereby the opening of the discharging closure renders the signal effective, and the subsequent movement of the charging closure renders said signal ineffective.

14. In a food vending machine, a food chamber provided with charging and discharging closures, a coin-controlled electric circuit for governing the opening of the discharging closure, and a second circuit for governing the closing of the discharging closure, said second circuit being controlled by movement of the charging closure, in combination with signalling means, controlled by said circuits, whereby the opening of the discharging closure renders the signal effective, and the subsequent movement of the charging closure renders said signal ineffective, and means, associated with one of said circuits, for recording the coins deposited in the machine.

15. In a food vending machine, a food chamber having a floor formed with hollow corner posts and spacing bars, said chamber being provided with charging and discharging closures, coin-actuated means for releasing the discharging closure to allow of the opening thereof, and means for closing the discharging closure, all of said means above the floor of the food chamber being housed in concealed positions within the hollow corner posts and spacing bars.

16. In a food vending machine, a food chamber having a floor and provided with a plurality of transparent walls supported by hollow corner posts and hollow bars, a discharging closure for said chamber, and coin-actuated means for releasing said closure to allow of the opening thereof upon the insertion of a coin into the machine, substantially all of the coin-controlled means positioned above the floor of said chamber being housed in concealed positions within the hollow corner posts and bars.

17. In a food vending machine, a food chamber having a floor and provided with a plurality of transparent walls supported by hollow corner posts and hollow bars, charging and discharging closures for said chamber, coin-actuated means for releasing said discharging closure to allow of the opening thereof upon the insertion of a coin into the machine, and means for subsequently closing said closure, substantially all of said closure operating means positioned above the floor of the chamber being housed within, and concealed from the purchaser by the hollow corner posts and bars.

18. In a food vending machine, a food chamber provided with charging and discharging closures, means, operable by the weight of a coin, for automatically releasing the discharging closure to allow of the opening thereof when a coin is deposited in the machine, and mechanism for subsequently closing the discharging closure, in combination with electrical means for effecting the operation of the closing means, and a switch operable by movement of the charging closure for rendering said electrical means operative or inoperative.

19. In a food vending machine, a food chamber provided with charging and discharging closures, means for opening the discharging closure, and electrically operated means, conditional for its operation upon the movement of the charging closure, for subsequently closing the discharging closure.

20. In a food vending machine, a food chamber provided with charging and discharging closures, means for locking the discharging closure in closed position, coin-actuated means for automatically unlocking said discharging closure upon the insertion of a coin into the machine, and electrical means, controlled by movement of the charging closure, for subsequently closing and relocking the discharging closure.

21. A food vending machine embodying a skeletonized frame for supporting the side walls and top of a food compartment, transparent wall members positioned in said skeletonized frame, a charging door and a transparent discharging door to the compartment in combination with automatic means concealed in said skeletonized frame and operable upon the introduction of a coin into the machine for opening the discharging door.

22. In a food vending machine, a food chamber provided with charging and discharging closures, a coin-controlled electric circuit for governing the opening of the discharging closure, and a second circuit for governing the closing of the discharging closure, said second circuit being controlled by movement of the charging closure, in combination with signalling means, controlled by said circuits, whereby the opening of the discharging closure renders the signal effective, and the subsequent movement of the charging closure renders said signal ineffective, and cash registering means, controlled by the electric circuit which governs the opening of the discharging closure, for recording the cash value of the operations of the machine.

23. In a food vending machine, a food chamber provided with charging and discharging closures, means for normally locking the discharging closure in closed position, electrical means automatically operable by the introduction of a coin into the machine, to effect the unlocking of the discharging closure, electrically operated means for closing the discharging closure and means controlled by movement of the charging closure for effecting the operation of the discharging closure operating means.

24. In a food vending machine, a food chamber provided with charging and discharging closures, coin actuated electrical means for releasing the discharging closure, and a spring for opening said closure after it has been released, in combination with electrical means, cooperating with the charging closure, for relocking the discharging closure prior to the closing of the charging closure.

25. In a food vending machine, a food chamber provided with charging and discharging closures, means for locking the discharging closure, means for opening the discharging closure when said locking means is released, coin controlled electrical means associated with the locking means and automatically operable by the insertion of a coin in the machine to actuate the locking means and unlock the discharging closure in combination with further electrical means, cooperating with the charging closure and operatively connected with the means for locking the discharging closure, whereby said charging closure cannot be opened to sufficient extent to permit charging of the food chamber without effecting locking of the discharging closure.

In testimony whereof I have signed my name to this specification.

JULIUS ZSOLDOS.